(12) United States Patent
Griffith et al.

(10) Patent No.: US 7,708,415 B2
(45) Date of Patent: May 4, 2010

(54) MIRROR STRUCTURE HAVING PIEZOELECTRIC ELEMENT BONDED TO A MIRROR SUBSTRATE

(75) Inventors: Michael Stewart Griffith, Chelmsford (GB); Leslie Charles Laycock, Ongar (GB); Nicholas John Archer, Chelmsford (GB); Andrew Graham McCarthy, Chelmsford (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 10/520,425

(22) PCT Filed: Oct. 20, 2004

(86) PCT No.: PCT/GB2004/004437

§ 371 (c)(1),
(2), (4) Date: Jan. 7, 2005

(87) PCT Pub. No.: WO2005/040885

PCT Pub. Date: May 6, 2005

(65) Prior Publication Data

US 2005/0254111 A1    Nov. 17, 2005

(30) Foreign Application Priority Data

| Oct. 20, 2003 | (EP) | 03256591 |
| Oct. 20, 2003 | (GB) | 0324448.0 |
| Jun. 9, 2004 | (GB) | 0412851.8 |
| Aug. 27, 2004 | (GB) | 0419171.4 |

(51) Int. Cl.
*G02B 5/08* (2006.01)

(52) U.S. Cl. .................................... 359/846

(58) Field of Classification Search .......... 359/846–849
See application file for complete search history.

(56) References Cited

U.S. PATENT DOCUMENTS 4,196,972 A    4/1980  Rawlings (Continued)

FOREIGN PATENT DOCUMENTS

EP    0 793 120 A1    11/1996

(Continued)

OTHER PUBLICATIONS

International Search Report dated Dec. 15, 2005—PCT/GB2004/004437.

(Continued)

*Primary Examiner*—Alessandro Amari
*Assistant Examiner*—Jennifer L. Doak
(74) *Attorney, Agent, or Firm*—Buchanan Ingersoll & Rooney PC (57) ABSTRACT

This invention concerns improvements relating to a deformable-mirror holder for holding a mirror in a desired position, to within accepted tolerances, even whilst the mirror is deforming or in a deformed state. More particularly but not exclusively, this invention relates to a holder for a bimorph mirror. A deformable mirror holder (31) is provided comprising a body with a receiving portion for receiving a deformable mirror (30), and wherein the receiving portion is defined by a passive flexible support structure (41) such that, in use, to the support structure provides a supporting surface to the mirror. This invention extends to a deformable mirror and a deformable mirror holder as described above.

34 Claims, 9 Drawing Sheets

U.S. PATENT DOCUMENTS

| | | | | |
|---|---|---|---|---|
| 4,226,507 A | * | 10/1980 | Fuschetto | 359/849 |
| 4,655,563 A | * | 4/1987 | Plante et al. | 359/849 |
| 4,670,338 A | * | 6/1987 | Clemino | 428/312.6 |
| 4,844,603 A | | 7/1989 | Eitel et al. | |
| 5,831,780 A | * | 11/1998 | Krim | 359/846 |
| 6,398,373 B1 | | 6/2002 | Guzman et al. | |
| 6,402,329 B1 | * | 6/2002 | Bailly et al. | 359/872 |
| 6,425,671 B1 | | 7/2002 | Adler et al. | |
| 2003/0107796 A1 | | 6/2003 | Bar et al. | |

FOREIGN PATENT DOCUMENTS

| | | |
|---|---|---|
| WO | 2004/057398 A1 | 7/2004 |
| WO | 2004/057406 A2 | 7/2004 |

OTHER PUBLICATIONS

International Search Report dated Oct. 7, 2004 issued for Application No. GB0412851.8.

International Search Report dated Dec. 2, 2004 issued for Application No. GB0419171.4.

International Search Report dated Apr. 19, 2004 issued for Application No. GB0324448.0.

* cited by examiner

MIRROR STRUCTURE HAVING PIEZOELECTRIC ELEMENT BONDED TO A MIRROR SUBSTRATE

FIELD OF THE INVENTION

This invention concerns improvements relating to a deformable mirror holder for holding a mirror in a desired position, to within accepted tolerances, even whilst the mirror is deforming or in a deformed state. More particularly but not exclusively, this invention relates to a holder for a bimorph mirror.

BACKGROUND OF THE INVENTION

Deformable mirrors are often used in the field of adaptive optics. For example, phase distortions in a signal may be sensed by a wavefront sensor and these distortions may be corrected for by an adaptive mirror. Such adaptive mirrors may be employed in numerous fields, including:
  imaging, for example adaptive mirrors are used in astronomy to improve the resolution of earth-based telescopes that are otherwise affected by atmospheric distortions;
  laser sensing, where the amount of laser light that can be delivered onto a target is significantly increased by using an adaptive mirror to correct for atmospheric distortions—this enables either better information to be obtained or objects to be identified at a greater range; and
  laser generation, where an adaptive mirror can be used intracavity within a high power laser to counter the thermal blooming that can be otherwise induced by the high concentration of laser light inside the cavity.

Bimorph deformable mirrors have been proposed as low cost adaptive mirrors. The two main operational parameters of a bimorph mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke would be maximised. However, conventional designs mean that there is a reciprocal relationship between these two parameters, and one parameter can only be improved at the expense of the other. Therefore, to date, designers have always looked for ways to improve either the resonant frequency or the stroke independently from each other.

Figure 1:
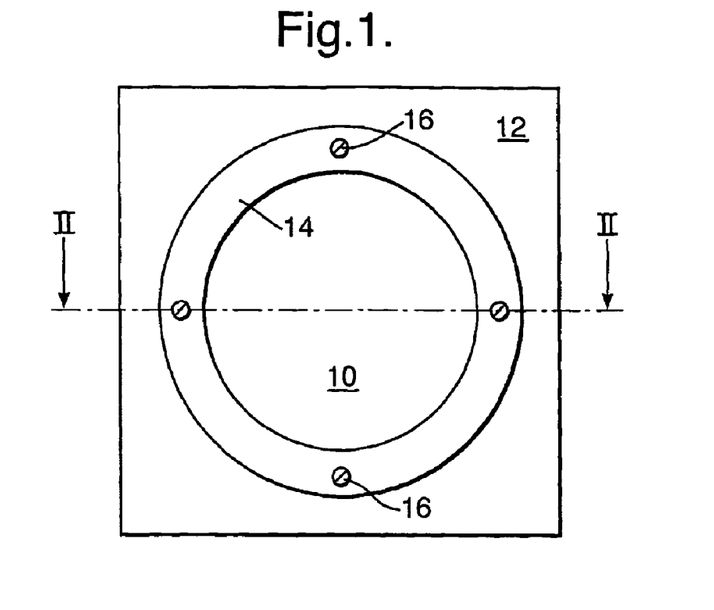
FIG. 1 is a plan view of a deformable mirror and a mount according to the prior art.
Figure 2:
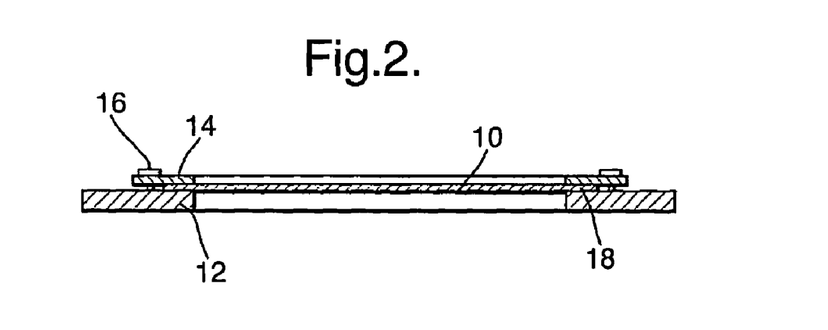
FIG. 2 is a cross-section through II-II of FIG. 1 showing the mirror in a relaxed state.
Figure 3:
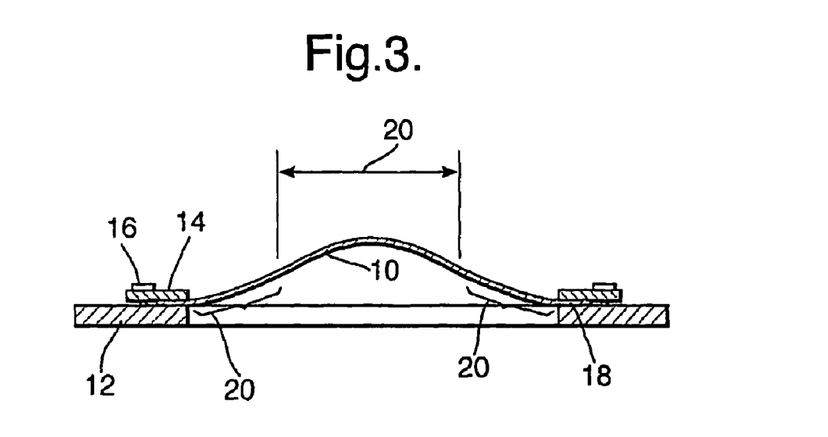
FIG. 3 corresponds to FIG. 2 but with the mirror in a state of exaggerated deformation, thereby illustrating the problem of dead space and the relatively small active area.

Conventionally, deformable mirrors are supported rigidly around their edge, for example an annular ring overlapping the periphery of the mirror is used to hold the mirror firmly in position. Such an arrangement benefits from being simple yet rugged. However, it has an inherent disadvantage in that it creates a dead space around the mirror's edge. This corresponds both to the area of the mirror held firmly under the annular ring and also to the adjacent area. This is because the useable area of the deformable mirror (the active area) must bend to adopt a desired profile, for example either a concave or a convex shape. The annular area between the active area and the annular ring must bend in the opposite sense and so forms an area of inflexion that has undesirable optical properties. Hence the active area occupies only a central portion of the whole mirror. This is illustrated in FIGS. 1 to 3, albeit with the deformation of the mirror exaggerated for the sake of clarity.

One way of alleviating this problem is to clamp the mirror at only three positions, such that the mirror edge can twist. However, this arrangement is to the detriment of ruggedness and the twisting introduces unwanted distortions leading to an optically inferior performance.

It is also known that for smaller mirrors, bonded piezoelectric elements (e.g. bimorph deformable mirrors) are preferred due to their relatively low cost. Such mirrors provide an adequate balance between bandwidth and stroke. However, the balance between bandwidth and stroke is especially important when looking to make larger mirrors e.g. mirrors with active apertures greater than 10 to 15 cms. In order to keep the resonant frequency and thus the bandwidth of the mirror constant, the thickness of the substrate must also increase. For the larger mirrors this will adversely affect the minimum curvature available from the mirror. For this reason, larger mirrors have historically been zonal mirrors. The fact that the substrate is supported by a large number of actuators means that the resonant frequency, and therefore bandwidth, is no longer directly linked to the mirror diameter. However, the overriding issue with this type of deformable mirror is the cost. Although there are a number of different actuator technologies available, none of them are cheap. This makes large mirrors expensive because as many as 300 actuators may be required. For a bonded piezoelectric element mirror, although a large piezoelectric element will be more expensive than a smaller one, the cost differential will not be as great. A second issue is that it is not always possible to place discrete actuators as close to each other as required because of their fairly large size.

Against this background, the Applicant has filed a UK patent application (No. 0309976.9, 30 Apr. 2003 filing date) directed to a deformable mirror comprising a reflective surface provided on a substrate and a layer of deformable material attached to the substrate that is operable to deform the mirror and wherein the substrate is supported by an actuator that is operable to deform the mirror. The actuator can be used to provide the basic deformation required of the mirror (e.g. focus), while the deformable material can be used to provide fine tuning of the mirror shape.

Additionally, against this background, the Applicant has filed a UK patent application (No. 0309979.3, 30 Apr. 2003 filing date) directed to a deformable mirror holder that simply supports the mirror uniformly around the edge.

OBJECTS AND SUMMARY OF THE INVENTION

The present invention aims to overcome or at least substantially reduce some of the above mentioned drawbacks associated with known mirror/mirror holder designs.

It is an object of the present invention to provide a low cost deformable mirror holder arrangement in which the substrate no longer needs to be supported from the edge and the resonant frequency and bandwidth characteristics are effectively increased over and above what it would be for a purely edge-supported arrangement. This means that it is possible to concentrate on optimising the design of the deformable material to give the maximum curvature with less constraint from the resonance effects.

It is another object of the present invention to provide a low cost mirror holder arrangement, for a bimorph mirror for example, in which the edge of the mirror is unconstrained and is free to move. This means that the entire mirror substrate can be used as the active mirror.

In broad terms, the present invention resides in the concept of providing a deformable holder for a mirror, where rather than being supported round the rim, the mirror in its upright condition is supported from underneath by a passive compliant/flexible support structure. It is to be understood that the term "passive" support herein is used to distinguish over the kind of actuator support which by application of a potential can be actively caused to expand or contract (for example, the kind of actuator formed of magnetostrictive or electrostrictive material).

Thus, according to the present invention there is provided a deformable mirror holder comprising a body with a receiving portion for receiving a deformable mirror, and wherein the receiving portion is defined by a passive flexible support structure such that, in use, the support structure provides a supporting surface to the mirror.

Preferably, the support structure comprises a plurality of discrete flexible support elements spatially arranged to support an inner face of the mirror substrate (that is, the mirror substrate in upright condition is supported from below), with each of the support elements having an end shaped to provide support to the mirror substrate and a flexible portion that connects the element's end to the holder's body. In a currently preferred embodiment, the supporting ends of the elements lie outside of the plane of the holder's body such that the mirror is held clear of the holder's body. This could be achieved by having bracket supports anchored or attached to the sidewall of the mount.

Optionally, at least one of the support elements is generally L-shaped such that one leg of the L-shape provides the flexible portion and the other leg of the L-shape provides the supporting surface of the element's end. This formation conveniently allows the supporting ends of the elements to bend with the mirror. It is also to be appreciated that strict compliance with the L-shape is not necessary. For example, the support element could be J-shaped rather than being L-shaped.

Preferably, the support elements are arrayed in equi-spaced relationship in a circle, with each of the elements being positioned so as to be in contact with each mirror electrode when in use. This kind of arrangement is particularly desirable where a large number of support elements are required to be mounted onto the base of the arrangement for use. This also means that the elements could be all positioned to lie on an inside diameter within the full outer mirror diameter of the arrangement. Alternatively, if desired, the elements could be mounted to lie on two or more separate inside diameters within the full outer mirror diameter of the arrangement.

Further, whilst the elements could be distributed in equi-spaced relationship within the full outer mirror diameter of the arrangement, it is equally possible instead for the elements to be randomly spaced apart within the full outer diameter of the arrangement, if desired.

In accordance with an exemplary embodiment of the invention which will be described hereafter in detail, the end-shaped supporting portion of each element is formed of complaint epoxy/rubber material and the remainder portion of each element is formed of metal material. Advantageously, this adds rigidity to the arrangement supporting the mirror in use and at the same time a flexible neck region is created that allows the supporting end to bend with the mirror as it deforms.

Optionally, the support elements are formed wholly of compliant epoxy/rubber material.

Conveniently, the support elements are in the form of compliant pillars mounted onto the base of the arrangement. In a currently preferred embodiment, the support elements are cylindrically-shaped compliant pillars. It is to be understood however that the support elements could have other kinds of shape and size, if desired; for example, the elements could just as easily be square pillars. It is also noted that the elements could be flanged to facilitate support of the mirror.

Optionally, the support elements are integrally formed as part of the holder body. This confers a degree of rigidity to the holder body arrangement. Alternatively, if desired, the support elements could be separately mounted onto the base of the arrangement.

Advantageously, the support elements could be made hollow inside, so that compliant material can be injected down them. It is thus possible to control the degree of flexibility of the elements by controlled injection of the compliant material.

Optionally, the support elements could be formed of compliant metal foam with an open cell structure.

In accordance with another exemplary embodiment of the invention which will be described hereafter in detail, the support structure comprises a generally solid unitary structure with compliant characteristics, which unitary structure is arranged to extend across the entire mirror substrate surface for support thereof from below.

Conveniently, the unitary structure is formed of epoxy/rubber material. Alternatively, if desired, the unitary structure could be formed of metal (or other type) foam.

Conveniently, the unitary structure includes a number of hole sections for permitting access through the structure to a number of mirror electrodes when in use.

Optionally, the unitary structure includes a number of metallic interconnections permitting connection to a number of mirror electrodes when in use, the metallic interconnections being further arranged to respond to the deformation of the unitary structure in use.

Having regard to the foregoing, it is thus to be appreciated that the number and positioning of the flexible support(s) can be allowed to vary depending upon the desired application and upon how flexible the support structure/supports are.

Optionally, in accordance with another embodiment of the invention which will be described hereafter in detail, a bar-shaped flexure mount design incorporating a cooling system is provided with coolant being fed into and out of radially extending conduits through the flexures. Because the conduits are interconnectably joined to form a continuous through-passage in the mirror and the mirror mount, it is possible for coolant to be controllably admitted and circulated therethrough. An advantage of this embodiment thus is that effective cooling through the flexures can be realised when the mirror is supported from its underneath. Another advantage of this embodiment is that it obviates the need for O-ring seals.

According to another preferred embodiment of the present invention, the compliance of the support structure may vary across the structure in order to tailor the response of a supported mirror to applied electrode biases. In particular, where discrete support elements are provided, the compliance of the support elements or of the compliant material used to form at least a portion of each support element may be varied according to the position of the support element within the support structure. Where a continuous compliant layer is provided, the compliance of the layer may vary according to distance from the edge of the layer, for example by varying the thickness of the layer or by constructing the layer from a series of discrete annuli each composed of material having a different compliance.

The present invention also extends to a deformable mirror and a deformable mirror holder as described above. Optionally, the above described mirror and mirror holder include a tip-tilt stage.

The above and further features of the invention are set forth with particularity in the appended claims and will be described hereinafter with reference to the accompanying drawings.

DETAILED DESCRIPTION OF PREFERRED EMBODIMENTS

In the following description, the same reference numerals as used in different Figures are used to designate same/like parts.

Further, in all embodiments described herein, the deformable mirror is a deformable bimorph 30 comprising a mirror substrate 32 whose outer face provides a reflecting surface 34 by virtue of a series of thin dielectric coatings provided on the outer face (not shown). At least one active piezoelectric element 33 is bonded to the non-active, inner face of the mirror substrate 32 using epoxy resin. A common electrode strip 38 is located between the non-active inner face of the mirror substrate 32 and the piezoelectric element 33. An array of electrodes 37 is used to activate the piezoelectric element(s) 33. Applying a bias voltage between the electrodes 37 and the common electrode 38 causes the piezoelectric element(s) 33 to deform locally so that, in turn, the mirror substrate 32 deforms to create a mirror with a desired shape, convex for example.

A deformable bimorph mirror 10 and its mount 12 according to the prior art are first shown in FIGS. 1 to 3. As can be seen, the mirror 10 is disc-shaped and is supported by the mount body 12. The mirror 10 is held firmly in position by an annular ring 14 that urges the mirror 10 against the mount body 12 via four screws 16. FIG. 3 shows the mirror 10 in a deformed state such that, in this example, it adopts a convex profile for light approaching from above. Ideally, the desired convex profile should extend across all the mirror 10, such that all the mirror 10 is available for reflecting light in the desired manner. However, the peripheral edge 18 of the mirror 10 is held firmly between the annular ring 14 and the mount body 12 and so cannot bend. Moreover there is a region 20 of the mirror 10 that adopts an area of inflexion to bridge the peripheral edge 18 of the mirror 10 and the convex portion 22 at the centre of the mirror 10. It is of course this convex-shaped part 22 of the mirror 10 that forms the active (i.e. useable) part 22 of the mirror 10. This active part 22 of the mirror 10 is shown in FIG. 3.

Figure 4:
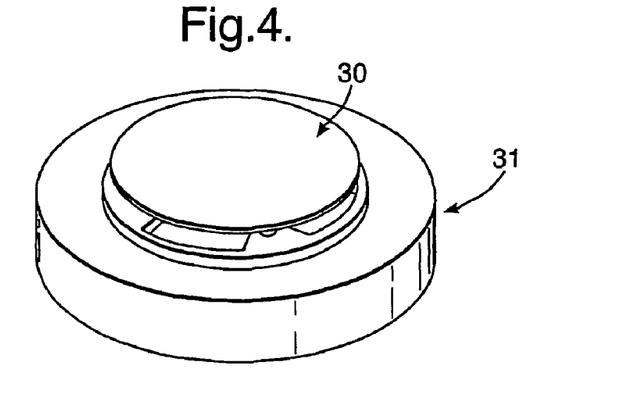
FIG. 4 is a perspective view of a deformable mirror on a mount according to a first embodiment of the present invention.

A deformable bimorph mirror 30 and a mount 31 according to a first embodiment of the present invention are shown in FIG. 4. The mount 31 is a unitary structure made from stainless steel material. The mount 31 comprises a round body that defines a receiving portion (as partially shown) sized and shaped to receive and support the disc-shaped deformable bimorph mirror 30 on top. As is shown in the Figure, the mirror 30 in its assembled (upright) condition on top of the mount 31 is held clear of the mount 31.

Figure 5:
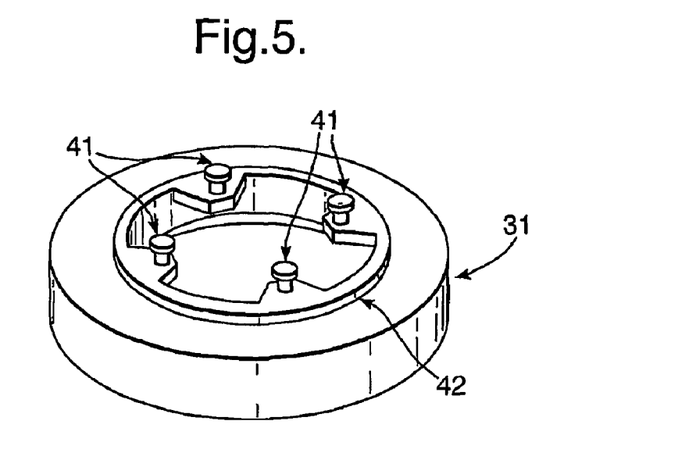
FIG. 5 is a further perspective view of the mirror mount of FIG. 4 showing the upstanding flexure supports (with the mirror removed)

FIG. 5 shows the mirror mount 31 of FIG. 4, without the mirror 30 for sake of clarity. The mount has a stepped profile 42 defining a generally circular aperture in the centre. Four flexure supports 41 are formed in equispaced relationship around the top most stepped section 42 of the mount body, each support being arranged to extend inwardly towards the centre of the aperture before turning upwards through 90° to extend in an upward direction for supporting the mirror (not shown). The four flexure supports 41 are formed as part of the mount body. The supports are of identical size and shape. The flexure supports and the mount body are formed of the same metal material. Thus, as shown in FIG. 5, each of the flexure supports 41 has a flexible upstanding end portion shaped to provide support to the mirror substrate (not shown) when in use, and a bridging flexible portion connecting the end portion to the mount holder's body. Because the supporting ends of the flexure supports are configured to lie outside of the plane of the holders body, the mirror in use is held clear of the holder's body on top.

Figure 6:
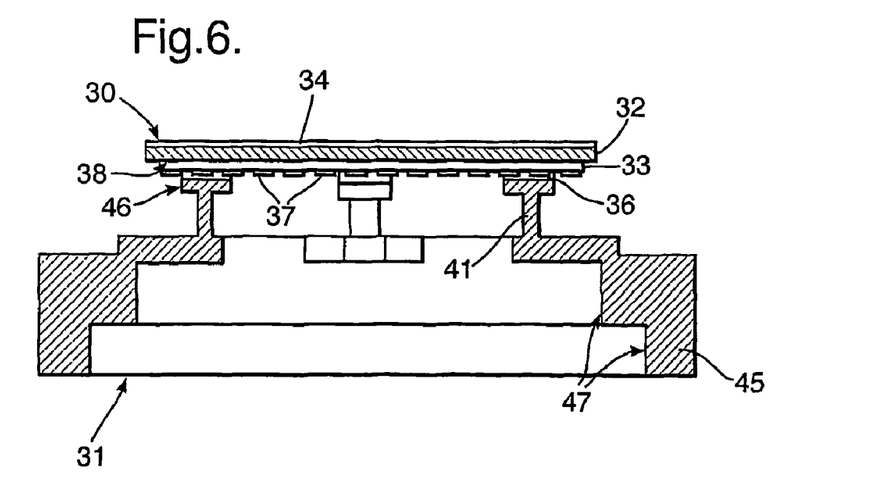
FIG. 6 is a cross-sectional view of the FIG. 4 arrangement.

FIG. 6 is an exploded cross-sectional view of the assembled mirror/mirror mount arrangement of FIG. 4. As can be seen, the non-active inner face of the substrate 32 is supported from below by each of the four passive flexure supports 41. With this kind of support there is significant benefit insofar as there is no longer any need to support the mirror 30 round its edge. With the edge of the mirror free to move, there will be fewer constraints on the mirror deformation around its edge.

As can also be seen in FIG. 6, each flexure support 41 has an L-shaped cross-section with one leg of the L-shape at one end attached to the base 45 of the mount and the other leg of the L-shape at its other end, bonded via glue 36, to the piezoelectric element 33. It is noted here that the mirror supporting end portion of each support is in the shape of a narrow neck 46 with flexible characteristics. It is this flexible neck portion 46 which can be flexed to permit the support to bend as the mirror substrate deforms. The length and thickness of the neck of each support are chosen to achieve the desired flexing properties.

Thus, in operation of the FIG. 6 arrangement, by applying a potential between the array of electrodes 37 and the common electrode strip 38 causes the piezoelectric element 33 to locally expand/contract, and this in turn induces a local curvature in the piezoelectric element/mirror substrate sandwich. In this way, the mirror 30 is controllably deformed. It is to be understood here that whilst only one piezoelectric element layer 33 is shown in the Figure, there are situations where it is advantageous to use two or more piezoelectric element layers (refer to the content of recently filed UK patent application No. 0309976.9, as filed by the Applicant on 30 Apr. 2003).

In this embodiment, the internal sides 47 of the mount body are stepped so as to provide shoulder formations for attachment to the leg portions of the supports 41. In this way, as can be seen, the supports 41 are formed as part of the mirror mount base (see also shaded region in the Figure).

Advantageously in this embodiment, the flexure supports 41 and the mirror mount base 45 are formed of metal material. Further, the flexure supports 41 are configured to provide a small (typically up to ~20 microns) amount of movement to be induced by the piezoelectric element (although they will also stiffen up the piezoelectric element). Thus, it is to be appreciated that any number of such flexure support, can be placed on an inside diameter for effective support of the mirror—for example, where the full mirror diameter is 60 mm, such flexure supports could be equispaced on an inside diameter of 40 mm.

FIG. 7 shows, by way of example only, four typical different electrode patterns 37 that can be used for activation of the piezoelectric element in the arrangement according to the first embodiment of the invention.

Figure 8:
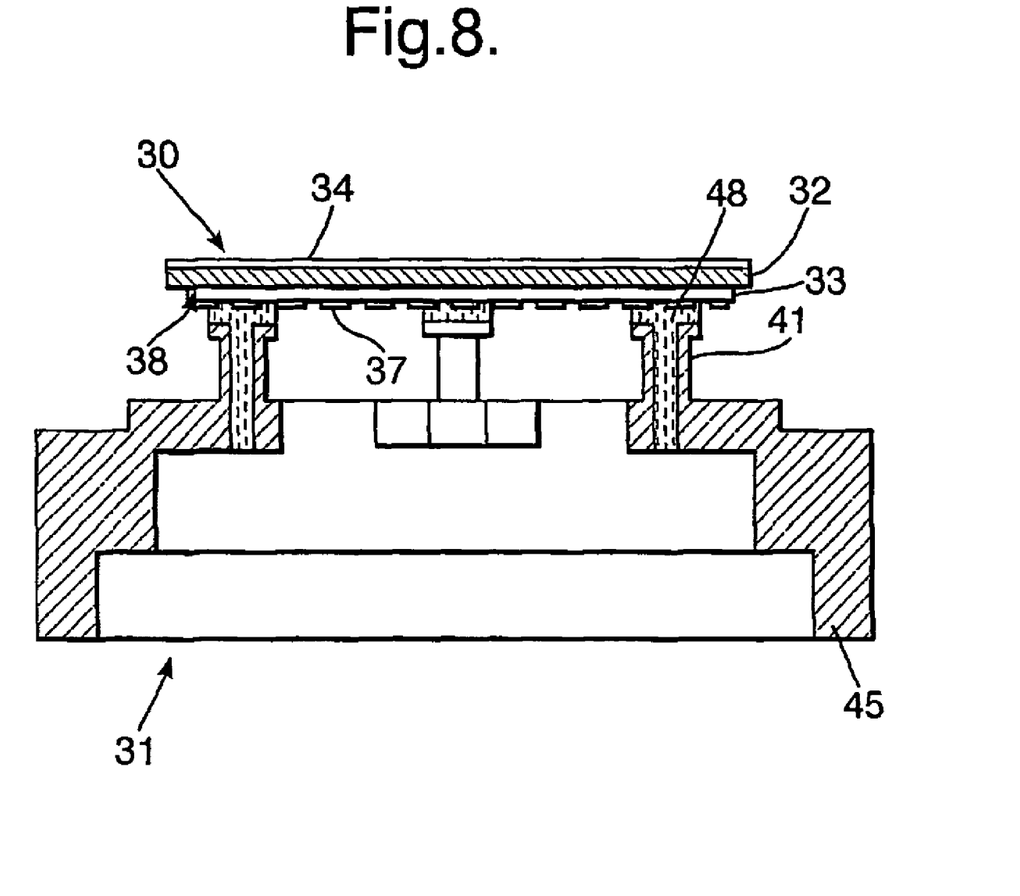
FIG. 8 shows a cross-sectional view of another embodiment of the present invention.

FIG. 8 shows a second embodiment of the present invention in cross-sectional view, which is very similar to the first embodiment as shown in FIG. 6. It differs in that the mirror supporting end portion of each passive flexure support comprises a layer of compliant epoxy/rubber material 48.

As shown in FIG. 8, the remainder portion of each support comprises metal material (see shaded area surrounding 48 in FIG. 8).

This arrangement bears definite advantage in that most of the desired compliance can come from the layer of epoxy/rubber material 48, whilst at the same time a degree of stiffness/rigidity in the supports is controllably achieved by virtue of the presence of metal flexure support material.

To facilitate assembly of the arrangement of FIG. 8, it is envisaged that the epoxy/rubber material is injected onto each flexure support from the back through a hole drilled vertically through the flexure (not shown)—in this case, it is to be understood that the mirror is required to be assembled upside down.

Figure 10:
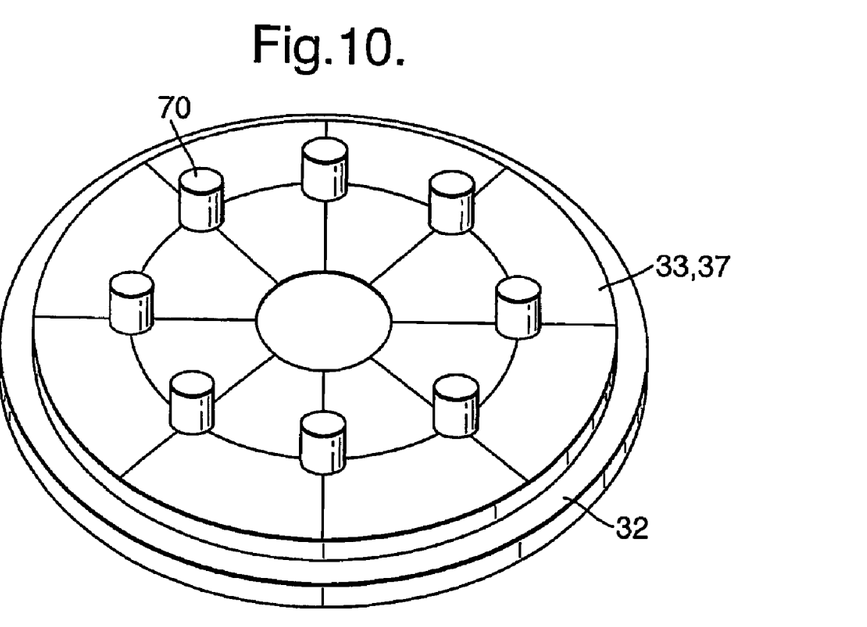
FIG. 10 corresponds to FIG. 9 but with the mould removed.

FIG. 10 shows a third embodiment of the present invention, without the mirror mount base for clarity. In common with the first and second embodiments, this embodiment has a mirror substrate 32, which is supported on its non-active, inner face by a plurality of flexure supports. With this kind of support there is significant benefit insofar as there is no longer any need to support the mirror 30 round its edge. With the edge of the mirror free to move, there will be fewer constraints on the mirror deformation around its edge. Further as shown in FIG. 10, each of the supports is bonded to the inner face of the mirror substrate 32 via the piezoelectric element 33/electrode array 37. This embodiment however differs in that there are eight flexure supports in the form of eight cylindrical-shaped pillars 70 arranged concentrically halfway along eight equi-spaced radii of the mirror. The eight support pillars 70 are formed of compliant epoxy/rubber material.

Figure 9:
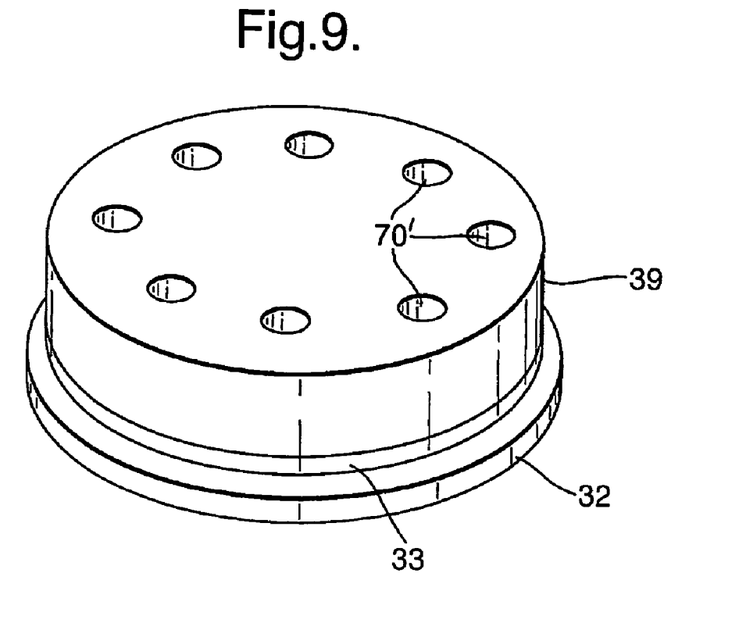
FIG. 9 shows a perspective view of another arrangement embodying the invention in which a mould is used.

FIG. 9 shows how the arrangement of FIG. 10 can be obtained in practice. As shown in FIG. 9, the eight support pillars 70 are formed by injecting epoxy/rubber material into a mould 39 that is placed against the piezoelectric element 33. The mould 39 has a release agent so that when the epoxy/rubber material is set inside receiving sections 70', the mould 39 can be removed thereby leaving behind the desired formation of the compliant pillars on the mirror substrate. Thus, in this case, all the compliance takes place in the pillars which are in turn bonded onto the mount base.

Figure 11:
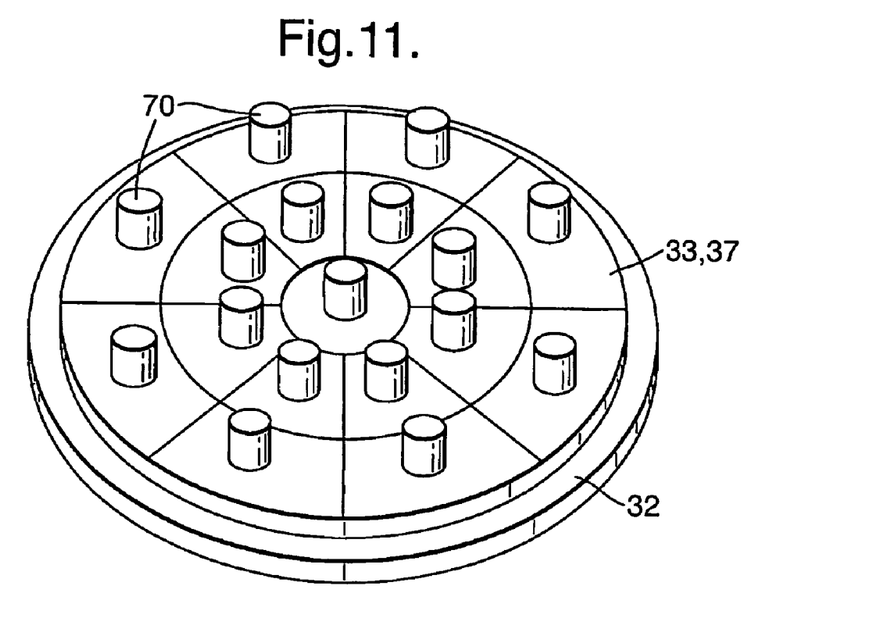
FIG. 11 shows another mirror arrangement (without the base for clarity) according to another embodiment of the present invention.

FIG. 11 shows a fourth embodiment of the present invention, without the mirror mount base for clarity (i.e. as viewed from the mirror's reverse side). In common with the third embodiment of FIG. 10, this embodiment has a mirror substrate 32 which is supported on its non-active, inner face by a plurality of flexure supports. With this kind of support there is significant benefit insofar as there is no longer any need to support the mirror 30 round its edge. With the edge of the mirror free to move, there will be fewer constraints on the mirror deformation around its edge. Further, as shown in FIG. 11, each of the supports is bonded to the inner face of the mirror substrate 32 via the piezo electric element 33/electrode array 37. This embodiment however differs in that there are a total of seventeen flexure supports in the form of seventeen cylindrical-shaped pillars 70 arranged as follows: there is a single central pillar 70 surrounded by two concentric rings of eight pillars 70. The rings are placed about one third and two thirds of the way along the radius of the mirror and the pillars 70 within each of the rings are arranged to sit on a common radius. In this embodiment, the pillars 70 are arranged such that they are attached to every mirror electrode 37 when in use. As described previously in the FIG. 10 embodiment, the support pillars 70 are formed of compliant epoxy/rubber material.

It is to be understood that the procedure using a mould as described in relation to FIGS. 9 and 10 can be suitably modified and adopted to produce the arrangement of FIG. 11.

Figure 7A:
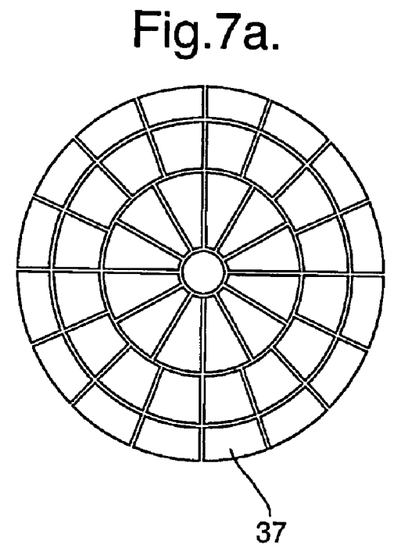
FIG. 7 shows four typical kinds of electrode pattern to which flexures of the type shown in FIGS. 5 and 6 can be attached.
Figure 7B:
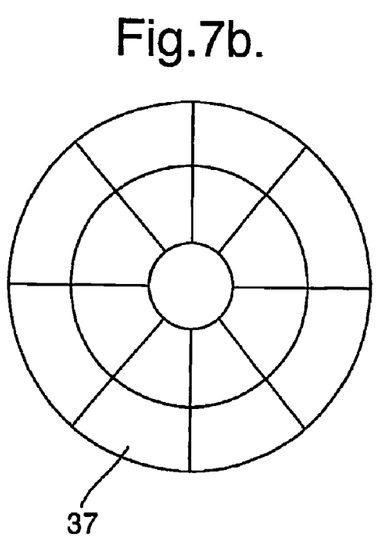
Figure 7C:
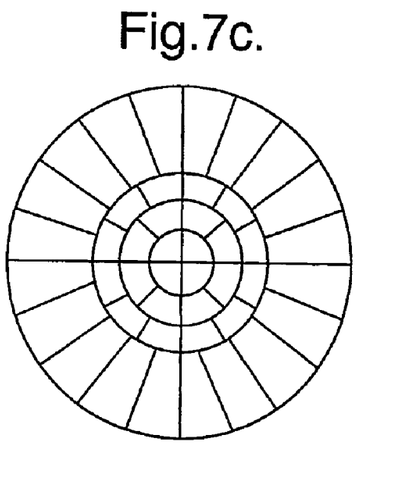
Figure 7D:
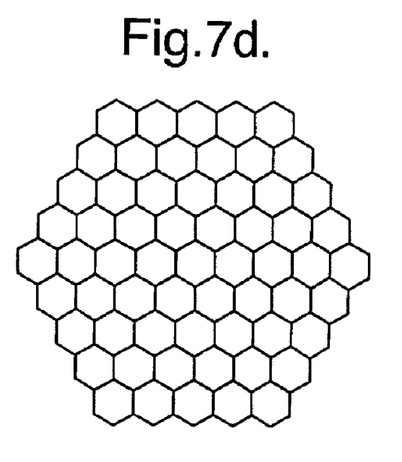

For some applications it may be advantageous to use conductive compliant pillars to form the flexure supports 70 in the embodiment of FIG. 11 in which each electrode is supported by a different compliant pillar. Such pillars can be made from metallic foams. The pillars can then be used to make connections to the electrode array 37, greatly simplifying the overall mirror structure since there is no need for additional components to make electrical connections to the lower electrodes. Conductive adhesive can be used to attach the pillars to the electrodes.

Where the electrode pattern is closed packed hexagonal, as shown in FIG. 7d, and each electrode is supported by a compliant pillar, deformations in a supported mirror are likely to be more localised and as such can be described as 'zonal'. For all preferred embodiments of the present invention involving multi-pillar support, and especially where each electrode is independently supported, the supported mirror structure is scalable to larger diameters and element array sizes without the need to significantly increase the thickness (and therefore reduce the maximum curvature) of the mirror structure.

The pillars should preferably have a Young's modulus of ~0.5-5 GPa. The Young's modulus of a conducting foam can be altered by altering the density of the foam structure. The size of the pillars can be varied to take account of variations in Young's modulus; a higher stiffness can be accounted for by a larger pillar, and a lower Young's modulus can be accommodated by a smaller pillar. The pillars can be made for any compliant conducting material of suitable stiffness; examples include metallic, silicon or silicon carbine foams, or graphite foams such as PocoFoam™.

The interconnect at the opposite end of the pillars (not shown), on which the pillars are mounted, can be a board with connections for each electrode. For particularly large mirrors, with large numbers of electrodes, it may be necessary to use a multilayer board, with the upper layer connecting to the pillars, whilst lower layers are used to make connection tracks that may be found in any convenient configuration to connect to an external driver. The thermal expansivity of the interconnect board should be matched to that of the mirror to avoid distortion of the mirror due to temperature variation. Suitable materials for fabrication of the substrate for the board thus include aluminium, that has a thermal expansion coefficient of ~1-3 ppm/° C.

The greater simplicity of the mirror when the pillars are used to form the connections to the electrodes enhances of the scalability of the design. Very large deformable mirrors can be made by combining individual mirrors so that they cover large areas. Such large deformable mirrors are used in astronomical telescopes. It is expected that the simplicity of the mirror when the pillars are used to form connections will make this design particularly suitable for such large, segmented mirrors.

It is to be also understood that it is possible to assemble the base (not shown) onto the mirror substrate 32 in the FIG. 11 embodiment at the same time as forming the compliant pillars if a mould is used that can be dissolved or heated to remove it without disturbing either the base or the mirror substrate 32.

Figure 12:
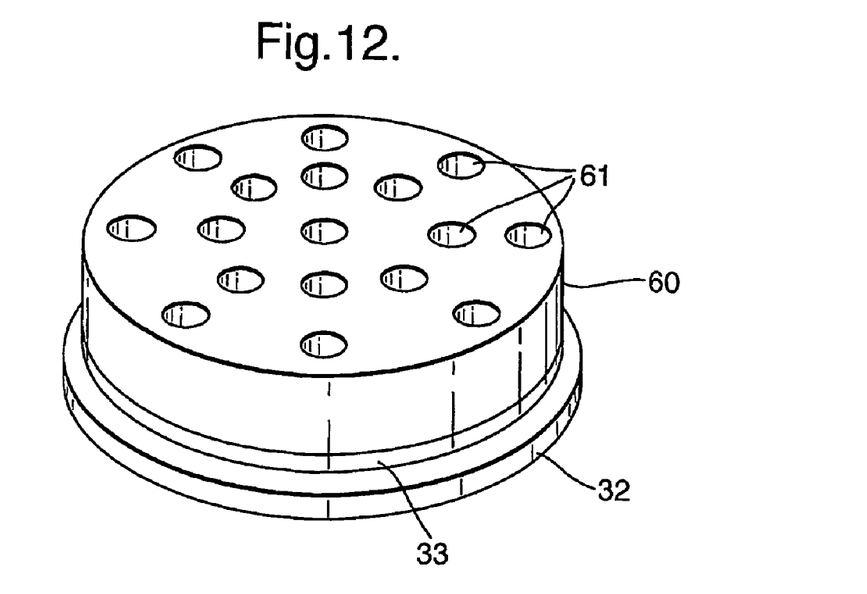
FIG. 12 shows a perspective view of a further arrangement (without the base for clarity) according to another embodiment of the present invention.

FIG. 12 shows a fifth embodiment of the present invention, without the mirror mount base for clarity (i.e. as viewed from the mirror's reverse side). In this embodiment, almost the entire inner face of the mirror substrate 32 is supported by a generally solid compliant material 60. This arrangement broadly corresponds to an inversion of the FIG. 11 arrangement in that whilst there are seventeen hole formations 61 in the compliant material 60 to permit connection to each of the mirror electrodes, most of the backside of the mirror is effectively supported by the compliant material 60.

In this embodiment, the compliant material of the passive support structure is rubber, epoxy or some form of metal (or other type foam). If desired, the compliant material could be readily configured as a narrow ridge structure (i.e. similar to the type of ridges that are used to stiffen up light structures) that follows the gaps between the mirror electrodes.

Figure 13:
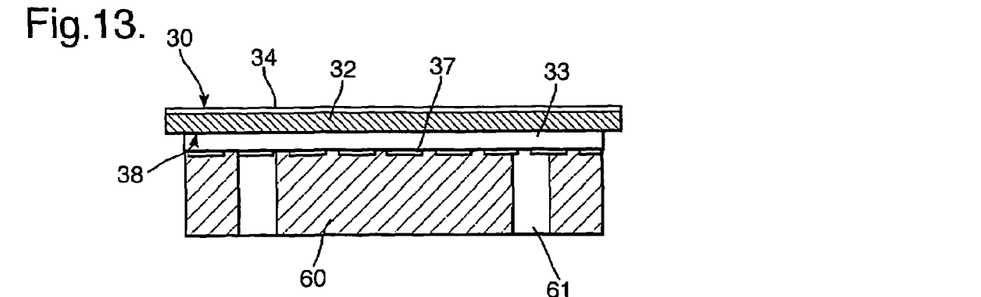
FIG. 13 corresponds to FIG. 12, but is a cross-sectional view.

FIG. 13 shows an exploded cross-sectional view of the FIG. 12 arrangement. As can be clearly seen, the compliant material 60 is arranged to cover the whole area of the piezoelectric element 33 except for where a hole formation 61 is required to enable a connection to be made to a mirror electrode 37.

Figure 14:
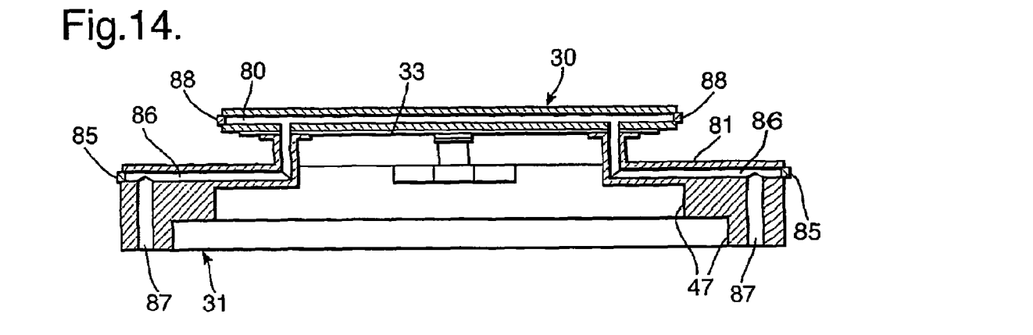
FIG. 14 shows a cross-sectional view of another arrangement with cooling through flexures according to another embodiment of the present invention.

FIG. 14 shows a sixth embodiment of the present invention in cross-sectional view, and which is based on the first embodiment as shown in FIG. 6. It differs in structure in that it provides a structural modification achieving cooling through the flexures when the mirror is supported from its underneath. The cooling system of FIG. 14 is described hereinafter.

As shown in FIG. 14, a modified bar flexure structure 81 is used to support the mirror 30 from its underneath. A plurality of radially extending through-passages 86 are provided in the mount 31 which go through the centre of the bar flexure structure 81 and meet with the radially extending conduits 80 in the mirror 30 from its underneath. As shown, the ends of the radially extending conduits 80 in the mirror 30 are plugged 88. The outer ends of the through-passages 86 in the mount 31 are sealed with a plug 85. In this embodiment, as shown, vertical passages 87 are formed in the mount 31 in such a way as to meet with the through-passages 86 near their outer ends. In this embodiment, it is to be also understood that holes are required to be formed through the piezoelectric element 33 (as shown).

Thus, in operation of the arrangement of FIG. 14, water coolant is fed into and out of the radially-extending conduits through the flexures from underneath the mirror. As shown in FIG. 14, the route for the water coolant is up through the vertical passages 87, then along and up the through-passages 86 in the mount and then through the radially-extending conduits 80 in the mirror 30.

In this way, effective cooling through the flexures of the arrangement of FIG. 14 can be achieved when the mirror is supported from its underneath. Another advantage of such an arrangement is that it obviates the need for O-ring seals.

Whilst water has been described as the coolant above, other types of coolant can also be used, if desired, such as any gas, a liquefied gas such as liquefied nitrogen, an anti-freeze solution or mercury.

Figure 15:
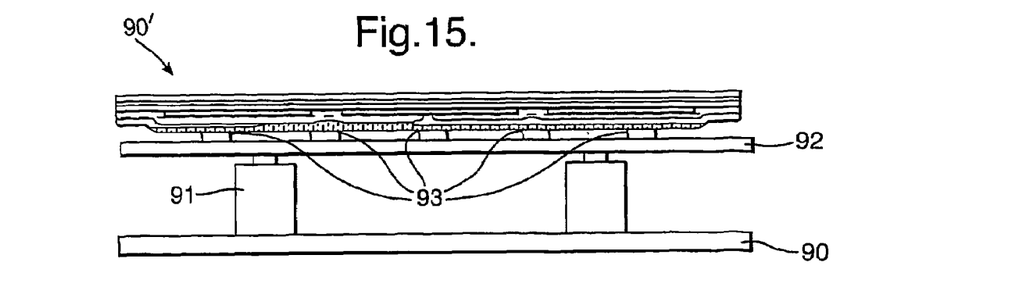
FIG. 15 shows a bimorph arrangement in cross-sectional view, for use with a tip-tilt stage.
Figure 16:
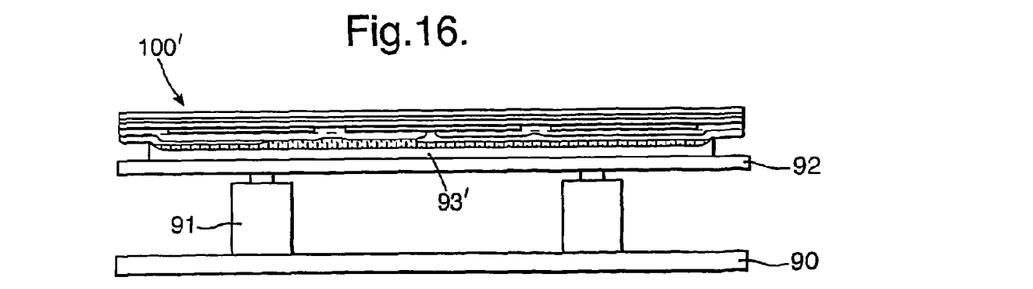
FIG. 16 shows another bimorph arrangement in cross-sectional view, for use with a tip-tilt stage.
Figure 17:
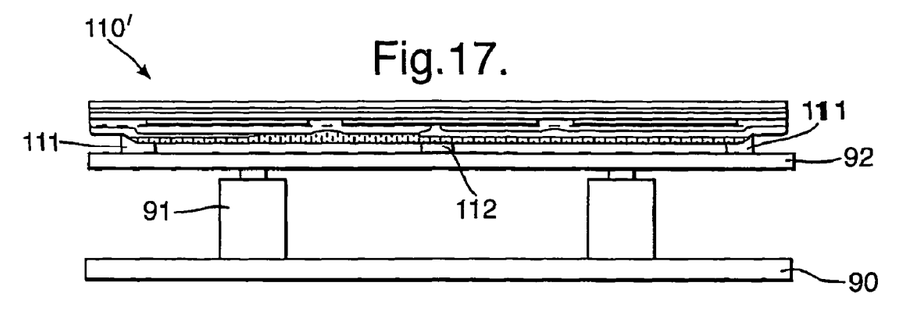
FIG. 17 shows yet another bimorph arrangement in cross-sectional view, for use with a tip-tilt stage.

It is to be appreciated that any of the above described passively supported arrangements of the embodiments could be integrated with a tip-tilt stage, if desired. FIGS. 15 to 17 show three different ways of accomplishing this, by way of example only.

FIG. 15 shows a bimorph arrangement 90' in cross-sectional view which is supported by a plurality of spaced-apart compliant pillars 93 integrated onto a tip-tilt stage. As shown in FIG. 15, the arrangement 90' comprises a base 90, a plurality of actuators 91, and a support disc 92. When the lower stage is used to correct for tip-tilt only, it is envisaged that the use of three or four actuators is adequate, provided that the support disc is thick enough so that it does not deform during operation. Alternatively, if desired, a larger number of actuators (i.e. use of five or more actuators) could be used instead in conjunction with a thin, deformable support disc. In this case, corrections for large scale distortions could be achieved by means of transferring deformations via the support disc and the pillars to the deformable mirror. This means that the bimorph mirror would remain active, but that it would only be required to correct for higher order distortions.

FIG. 16 shows another bimorph arrangement 100' in cross-sectional view which broadly corresponds to the arrangement of FIG. 15, the only difference being that the mirror of FIG. 16 is supported by a continuous compliant strip 93' (rather than by a plurality of discrete, spaced-apart complaint pillars as shown in FIG. 15). It is to be understood that many features of this arrangement 100' are the same as for the arrangement 90' shown in FIG. 15 and so have been assigned same reference numerals.

FIG. 17 shows another bimorph arrangement 110' in cross-sectional view which broadly corresponds to the arrangement of FIG. 15, the only difference being that the mirror of FIG. 17 is supported by a compliant ring 111 at its periphery, together with a single compliant pillar 112 at its centre. It is to be understood that many features of this arrangement 110' are the same as for the arrangements 90' and 100' shown in FIGS. 15 and 16 and so have been assigned same reference numerals.

Figure 18:
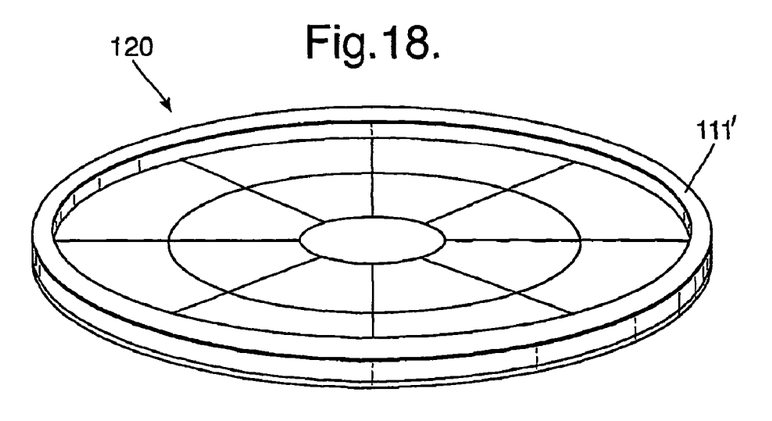
FIG. 18 shows a mirror support arrangement (without mirror mount base and tip-tilt stage), using a compliant ring at the mirror periphery only.

It is to be noted that omission of the central compliant pillar 112 from the arrangement of FIG. 17 means that the lower stage can then only be used to provide tip-tilt control, there being no mechanism for the transfer of distortions to the centre of the mirror. Without the mirror mount base and tip-tilt stage shown, this then corresponds to the mirror support arrangement 120 of FIG. 18, using a compliant ring 111 at the periphery only (i.e. as viewed from the mirror's reverse side).

Whereas the use of a single layer of actuators is described in relation to the arrangements of FIGS. 15, 16 and 7, additional layers of actuator can be incorporated (not shown) for use with large mirrors. The particular configuration/number of the actuators can also be varied. For example, where there is a requirement for a very rigid coupling between the base and the support disc, the actuators could be configured to form a hexapod arrangement (not shown), thereby providing a highly stable, 3-point mounting system based upon the use of six actuators.

Figure 19:
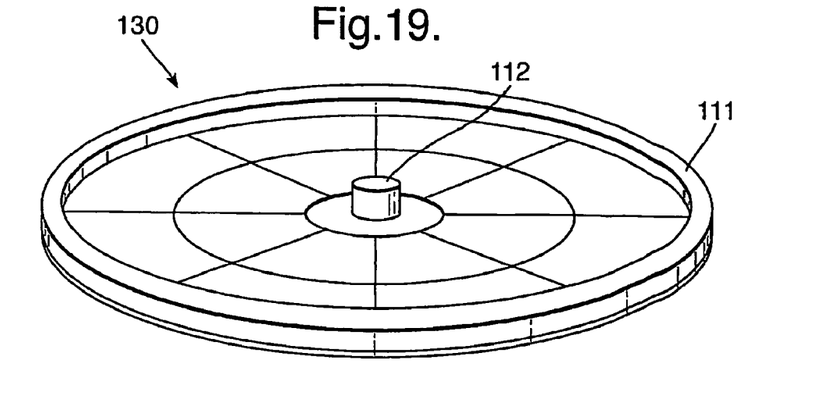
FIG. 19 shows the mirror support structure of FIG. 17, without the mirror mount base and tip-tilt stage for clarity.

FIG. 19 shows the mirror support structure of FIG. 17, without the mirror mount base and tip-tilt stage for clarity (i.e. as viewed from the mirror's reverse side). As clearly shown by the arrangement 130 in the Figure, the mirror is supported by a ring of compliant epoxy/rubber material 111 round the rim of the mirror, and also by a single compliant pillar 112 in the centre of the mirror. The central pillar 112 is designed to provide additional structural support, but it does not stop the deformable mirror from providing tip-tilt correction.

Whereas the ring and the central pillar of the above described FIG. 19 arrangement are formed of compliant epoxy/rubber material, other compliant materials (metal foam for example) could equally be used instead, if desired. In addition, the shape, size and number of compliant supports used is not critical—for example, the compliant ring could alternatively be arranged to extend across part of the mirror substrate surface for support thereof from below (as opposed to being confined to support the rim of the mirror, as shown in FIG. 19), and additional compliant pillars could also be positioned at various locations across the mirror substrate surface, if desired (not shown).

Figure 20:
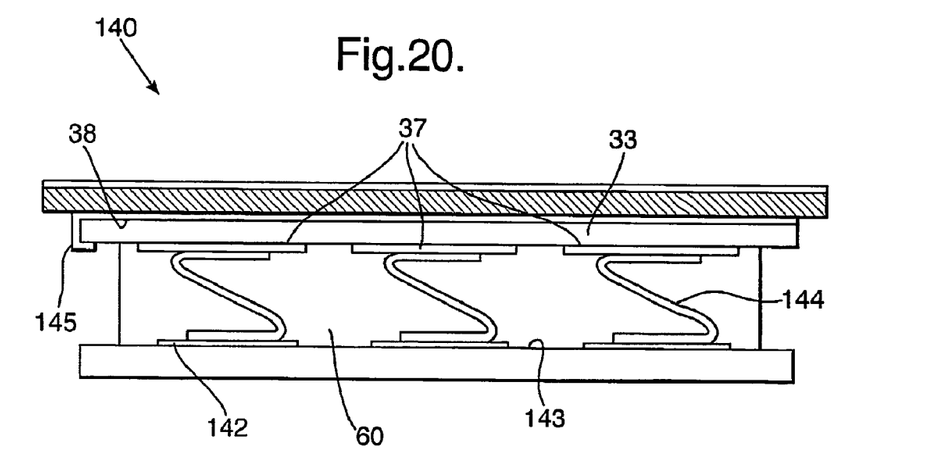
FIG. 20 shows a cross-sectional view of another arrangement, with a different way of making connection to the mirror electrodes, according to another embodiment of the present invention.

A further embodiment of the present invention is shown in FIG. 20. In common with the embodiment of FIG. 13, compliant material 60 is arranged to cover the whole area of the piezoelectric element 33. However, the embodiment of FIG. 20 shows a different method for making connection to the mirror electrodes 37. As shown in the arrangement 140 of FIG. 20, each PZT electrode 37 is connected to a pad 142 on an interconnection PCB 143 via a thin metal strip 144 which is in turn embedded into the compliant material 60 (see dotted region in Figure). In this embodiment, the metal material comprises phosphor bronze which is resilient with elastic properties and each of the strips has an S-type shaped bend to allow the thin metal strip to follow the deformation of the compliant material. As also shown in the Figure, a wrap around electrode 145 is provided on the piezoelectric element 33 which facilitates connection to the common electrode 38. Whereas the metal material in the arrangement of FIG. 20 is phosphor bronze, other materials which are resilient with suitable elastic properties could be used instead, if desired. In addition, the shape, size and/or number of the metal strips used in FIG. 20 is not critical—for example, the metal strips could each have two or more bends (not shown) as long as these can follow the deformation of the compliant material.

Is has been noted by the inventors in the present case that for preferred embodiments of the present invention having either multi-pillar supports (e.g. those shown in FIGS. 6, 8, 10 and 11) or continuous compliant supports (e.g. those shown in FIGS. 13 and 20), the amount of movement induced in a supported bimorph mirror as a result of applying a given bias to any particular electrode varies according to the distance of the electrode from the mirror edge. In an ideal situation, a bias applied to one of the electrodes should result in a smoothly varying displacement response across the whole mirror.

To improve the performance of supported bimorph mirrors towards the ideal, the compliance of supports in preferred multi-pillar and continuous compliant support embodiments of the present invention may be varied according to distance of the support or part of the support from the edge of the mirror. In this way the response of the supported mirror to applied electrode biases can be tailored to a predetermined response function. For example, for a continuous compliant support, the compliance may be increased towards the centre of the support so that when a uniform bias (not necessarily the maximum possible applied bias) is applied to each of the electrodes the mirror provides a purely spherical response. Other response functions can be provided by applying a different compliance profile across the support(s).

In preferred multi-pillar support embodiments, it may be advantageous to modify the compliance of the supports to ensure that each electrode has the same 'zonal' response function. It would also be possible to modify the compliance of the supports so that the mirror provides a curved response when a uniform field is applied to all the electrodes.

There are a number of ways in which the compliance of the supports can be modified. For a multi-pillar mirror support, any of the following preferred techniques may be used individually or in combination:

a) varying the stiffness (or Young's modulus) of the material that the pillar is made from according to the distance of the pillar from the edge of the mirror, e.g. by using epoxies/silicon rubber with different stiffness or using foams with different densities;

b) using a material with uniform stiffness, but varying the pillar diameter;

c) using a material with uniform stiffness, but varying the height of the pillar. This could be smoothly varying, or in the form of a number of discrete steps.

For a continuous mirror support, any of the following preferred techniques may be used individually or in combination:

d) varying the stiffness of the compliant material with respect to the edge of the mirror. This may be achieved by making the support material in the form of a number of discrete annuli each having a different compliance. If the compliant material is in the form of a foam, then the foam density may be varied as a function of distance to the mirror edge;

e) using a material with a uniform stiffness, but varying the thickness of the material as a function of distance to the mirror edge.

It has been noted that in both the multi-pillar and the continuous compliant support embodiments, in order to enable sufficient movement at the mirror centre, any support at that point needs to have a very high compliance. This can lead to undesirable low frequency torsion and sheer modes in a supported mirror. In a preferred embodiment, such undesirable modes may be damped, for a mirror supported by a continuous compliant layer, by adding extra support around the edge of the compliant layer. A preferred technique for adding extra support around the edge of a continuous compliant layer is shown in FIG. 21.

Figure 21:
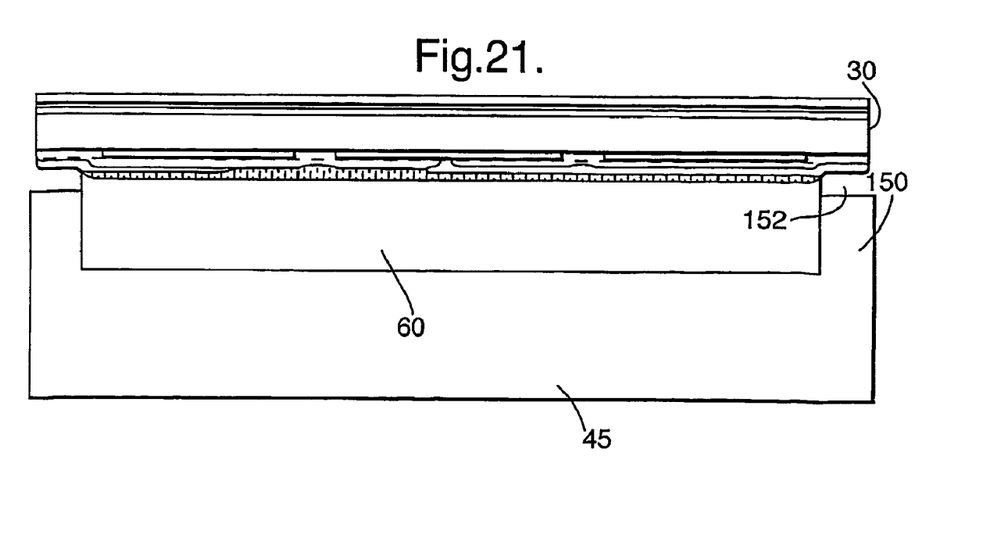
FIG. 21 shows a cross-sectional view of another arrangement in which the edge of the support base is extended in a flange portion to provide edge support to a continuous compliant layer.

Referring to FIG. 21, the edge of the support base 45 is extended in a flange portion 150 so as to enclose the compliant layer 60 at least partially. A gap 152 may be provided between the upper surface of the flange portion 150 and the underside of any projecting portion of a supported mirror 30. Alternatively, the gap 152 may be filled with a compliant epoxy/silicon rubber, for example, to provide extra support to the outer portion of a supported mirror. Moreover, the flange portion 150, together with the compliant epoxy/silicon rubber gap filler, or any other type of compliant supporting element deployed at the outer edge of the support structure, may be used in respect of any of the preferred embodiments of the present invention described above, whether having multi-pillar or continuous compliant layer support structures, to provide extra support to the outer portion of a supported mirror and hence have the effect of damping undesirable low frequency torsion and sheer modes in the mirror.

Having thus described the present invention by reference to various preferred embodiments, it is to be appreciated that the embodiments are in all respects exemplary and that modifications and variations are possible without departure from the spirit and scope of the invention. For example, the number, positioning, shape and size of the flexible support(s) could be allowed to vary depending upon the desired application and upon how flexible the support structure/supports are. For example, the performance of the FIG. 11 embodiment could possibly be improved, if desired, by provision of additional supports on the inner face of the mirror substrate and by using square or other shaped flexible supports with inclusion of a flange where the supports meet the piezoelectric element.

Whilst the mount of the above embodiments is made from stainless steel, many other materials such as other metals, plastics, glasses or ceramics could be used instead.

Whilst the described arrangements of the embodiments in FIGS. 15, 16 and 17 are integrated onto a tip-tilt stage, the respective various component parts can alternatively be assembled separately without need for integration.

The present invention is perfectly well suited for use in supporting all types of unimorph or bimorph mirror structures.

The invention claimed is:

1. A mirror structure comprising:
a self-deforming mirror mounted on a passive flexible support structure said mirror having a piezo electric actuator that is bonded to a mirror substrate, and including electrodes for applying electric fields to selected regions of the actuator layer to thereby deform the mirror substrate without applying forces to the support structure,
the support structure comprising, one or more passive flexible support elements attached to the piezo electric actuator of arranged to provide a supporting surface on which the self-deforming mirror is mounted, wherein the support structure is arranged to enable a deformation response in the self-deforming mirror mounted thereon such that the self deforming mirror is operable to adopt a predetermined deformation profile by the application of electrical fields across regions of the piezo-electric actuator.

2. The mirror structure as claimed in claim 1, wherein a plurality of said passive flexible support elements are spatially arranged to support the self-deforming mirror from below, with each of the support elements having an end shaped for providing support to the self-deforming mirror and a flexible portion that connects the supporting end of the support element to a body portion of the support structure.

3. The mirror structure as claimed in claim 2, wherein at least one of the support elements is generally L-shaped such that one leg of the L-shape provides the flexible portion and the other leg of the L-shape provides the supporting end of the support element.

4. The mirror structure as claimed in claim 2, wherein the support elements are formed of compliant epoxy/rubber material.

5. The mirror structure as claimed in claim 4, wherein the compliance of compliant material selected to form at least a portion of each of the support elements varies according to an established position of the support element in the support structure.

6. The mirror structure as claimed in claim 5, wherein the compliance of the selected compliant material varies according to the distance of the respective support element from the edge of a supported mirror substrate.

7. The mirror structure as claimed in claim 4, wherein the compliance of each of the support elements varies according to the position of the support element in the support structure.

8. The mirror structure as claimed in claim 7, wherein the compliance of each of the support elements varies according to the length of the support element.

9. The mirror structure as claimed in claim 7, wherein the compliance of each of the support elements varies according to the cross-sectional area of the support element.

10. The mirror structure as claimed in claim 7, wherein the compliance of each of the support elements varies according to the compliance of the compliant material used to form the support element.

11. The mirror structure as claimed in claim 2, wherein the supporting end of each support element is formed of compliant epoxy/rubber material and the remainder portion of each support element is formed of metal material.

12. The mirror structure as claimed in claim 2, wherein the support elements are formed as integral parts of the body portion of the support structure.

13. The mirror structure as claimed in claim 1, wherein the support structure comprises a generally solid unitary structure with compliant characteristics, which unitary structure is arranged to extend across the entire width of the self-deforming mirror surface for support thereof from below.

14. The mirror structure as claimed in claim 13, wherein the unitary structure is formed of epoxy/rubber material.

15. The mirror structure as claimed in claim 13, wherein the unitary structure includes a number of hole sections for permitting access to a number of electrodes of the self-deforming mirror when mounted thereon.

16. The mirror structure as claimed in claim 13, wherein the unitary structure includes a number of metallic interconnections permitting connection to a number of electrodes of the self-deforming mirror when mounted thereon, which metallic interconnections are arranged to respond to the deformation of the unitary structure in use.

17. The mirror structure as claimed in claim 16, further comprising a tip-tilt stage.

18. The mirror structure as claimed in claim 13, wherein the compliance of the unitary structure varies according to the distance from the edge of the unitary structure.

19. The mirror structure as claimed in claim 18, wherein the unitary structure comprises a plurality of discrete annuli each composed of a compliant material having a different compliance.

20. The mirror structure as claimed in claim 18, wherein the thickness of the unitary structure varies according to distance from the edge of the unitary structure.

21. The mirror structure as claimed in claim 13, wherein the unitary structure is composed of a compliant material having substantially uniform compliance and a thickness of the unitary structure varies according to distance from the edge of the unitary structure.

22. The mirror structure as claimed in claim 1, wherein the required deformation response for the self-deforming mirror includes a resonant frequency for the self-deforming mirror mounted on the support structure.

23. The mirror structure as in claim 1, wherein the deformation response for the self-deforming mirror includes a required stroke characteristics for the self-deforming mirror mounted on the support structure.

24. A deformable mirror holder comprising a body with a receiving portion for receiving a deformable mirror wherein the receiving portion is defined by a passive flexible support structure such that, in use, the support structure provides a supporting surface to the mirror,
wherein the support structure comprises a plurality of discrete flexible support elements spatially arranged to support the mirror substrate from below, with each of the support elements having an end shaped to provide support to the mirror substrate and a flexible portion that connects the element's end to the holder's body, and
wherein the support elements are formed of a conducting compliant foam such that they permit electrical connection to a number of mirror electrodes.

25. A mirror structure comprising:
a self-deforming mirror; and
a passive flexible support structure comprising one or more passive flexible support elements on which the self-deforming mirror is supported,
wherein the support structure is arranged to enable a deformation response in the self-deforming mirror thereon, and
wherein the self-deforming mirror comprises a mirror substrate that defines a reflective mirror surface, and at least one morphing layer bonded to the substrate and actuable to deform the mirror substrate by applying loads thereto without applying loads to the flexible support elements.

26. The structure as claimed in claim 25, wherein the self deforming mirror comprises a reflective surface provided on the substrate, the morphing layer comprising a piezoelectric element and electrodes for applying operating potentials thereto.

27. The mirror structure as claimed in claim 26, wherein each of the support elements is comprising:
a plurality of spatially-distributed support elements positioned so as to be in supportive contact with a different electrode of the self-deforming mirror mounted thereon actuator.

28. The mirror structure as claimed in claim 26, comprising a cooling system.

29. The mirror structure as claimed in claim 28, wherein said cooling system comprises a number of interconnecting conduits which are joined to form a continuous through-passage, enabling coolant to be admitted and circulated therethrough.

30. The mirror structure as claimed in claim 26, wherein the self-deforming mirror is a bimorph self-deforming mirror, the piezoelectric actuator comprising having at least one layer of deformable material piezoelectric material as said piezoelectric element.

31. The mirror structure as claimed in claim 26, wherein at least some of the support elements are disposed in equispaced relationships in a circular arrangement, each positioned so as to be in contact with one or more mirror of the electrodes when in use.

32. The mirror structure of claim 26, wherein the electrode includes a common electrode disposed between the mirror substrate and the piezoelectric element.

33. The mirror structure of claim 32, wherein the common electrode step is disposed on an upper surface of the piezoelectric element and an array of electrodes are disposed on a lower surface of the piezoelectric element.

34. The mirror structure of claim 33, wherein the array of electrodes is disposed between the piezoelectric element and the one or more passive flexible support elements.

* * * * *